United States Patent
Kampf

(10) Patent No.: US 10,472,454 B2
(45) Date of Patent: Nov. 12, 2019

(54) PREPARING RIGID POLYURETHANE FOAMS

(71) Applicant: BASF SE, Ludwigshafen (DE)

(72) Inventor: Gunnar Kampf, Stemwede-Haldem (DE)

(73) Assignee: BASF SE, Ludwigshafen (DE)

( * ) Notice: Subject to any disclaimer, the term of this patent is extended or adjusted under 35 U.S.C. 154(b) by 494 days.

(21) Appl. No.: 13/740,732

(22) Filed: Jan. 14, 2013

(65) Prior Publication Data

US 2013/0184369 A1  Jul. 18, 2013

Related U.S. Application Data

(60) Provisional application No. 61/587,688, filed on Jan. 18, 2012.

(51) Int. Cl.
| | | |
|---|---|---|
| *C08G 18/08* | (2006.01) | |
| *C08G 18/09* | (2006.01) | |
| *C08G 18/22* | (2006.01) | |
| *C08G 18/40* | (2006.01) | |
| *C08G 18/42* | (2006.01) | |
| *C08G 101/00* | (2006.01) | |

(52) U.S. Cl.
CPC ........... *C08G 18/14* (2013.01); *C08G 18/092* (2013.01); *C08G 18/225* (2013.01); *C08G 18/4018* (2013.01); *C08G 18/4288* (2013.01); *C08G 2101/0025* (2013.01)

(58) Field of Classification Search
CPC .... C08G 18/4288; C08G 18/09; C08G 18/14; C08G 18/225; C08G 18/4018
USPC ........................................ 521/170, 174, 172
See application file for complete search history.

(56) References Cited

U.S. PATENT DOCUMENTS

| | | | |
|---|---|---|---|
| 3,138,562 A | | 6/1964 | Nischk et al. |
| 3,399,154 A | | 8/1968 | Bernstein et al. |
| 5,436,314 A | * | 7/1995 | Yang et al. .................... 528/274 |
| 2005/0004403 A1 | * | 1/2005 | Guttes et al. ................ 568/679 |
| 2008/0053032 A1 | * | 3/2008 | Hockemeyer et al. .... 52/651.07 |
| 2010/0076101 A1 | | 3/2010 | Reese et al. |
| 2011/0133122 A1 | | 6/2011 | Lista |
| 2011/0201716 A1 | * | 8/2011 | Gehinger et al. ............. 521/172 |
| 2011/0218262 A1 | | 9/2011 | Eling et al. |
| 2011/0263736 A1 | | 10/2011 | Kösters et al. |
| 2012/0142799 A1 | | 6/2012 | Gehringer et al. |
| 2012/0214891 A1 | | 8/2012 | Gehringer et al. |
| 2012/0214892 A1 | | 8/2012 | Kunst et al. |
| 2012/0244303 A1 | | 9/2012 | Tomasi et al. |
| 2012/0264841 A1 | | 10/2012 | Tomovic et al. |
| 2012/0264842 A1 | | 10/2012 | Tomovic et al. |

FOREIGN PATENT DOCUMENTS

| | | |
|---|---|---|
| DE | 41 29 285 A1 | 3/1993 |
| WO | WO 2008/058920 A1 | 5/2008 |
| WO | WO 2010/015642 A1 | 2/2010 |
| WO | WO-2010043624 A2 * | 4/2010 |
| WO | WO 2010/115532 A1 | 10/2010 |

OTHER PUBLICATIONS

U.S. Appl. No. 13/848,427, filed Mar. 21, 2013, Kampf.
U.S. Appl. No. 13/740,732, filed Jan. 14, 2013, Kampf.
U.S. Appl. No. 14/034,745, filed Sep. 24, 2013, Kampf, et al.
Search Report dated May 22, 2012 in European Patent Application No. 12151577.9 (with English translation of category of cited documents).
U.S. Appl. No. 13/423,503, filed Mar. 19, 2012, US2012/0244303 A1, Tomasi, et al.
U.S. Appl. No. 13/037,983, filed Mar. 1, 2011, US2011/0218262 A1, Eling, et al.
U.S. Appl. No. 13/090,562, filed Apr. 20, 2011, US2011/0263736 A1, Kösters, et al.
U.S. Appl. No. 13/397,163, filed Feb. 15, 2012, US2012/0214892 A1, Kunst, et al.
U.S. Appl. No. 13/307,593, filed Nov. 30, 2011, US2012/0142799 A1, Gehringer, et al.
U.S. Appl. No. 13/400,835, filed Feb. 21, 2012, US2012/0214891 A1, Gehringer, et al.
U.S. Appl. No. 13/438,252, filed Apr. 3, 2012, US2012/0264841 A1, Tomovic, et al.
U.S. Appl. No. 13/443,336, filed Apr. 10, 2012, US2012/0264842 A1, Tomovic, et al.
U.S. Appl. No. 13/731,317, filed Dec. 31, 2012, Kampf.
U.S. Appl. No. 14/210,824, filed Mar. 14, 2014, Jacobmeier, et al.
U.S. Appl. No. 13/740,732, filed Jan. 14, 2013, US2013/0184369 A1, Kampf.
U.S. Appl. No. 14/176,366, filed Feb. 10, 2014, Jacobmeier, et al.

* cited by examiner

*Primary Examiner* — Melissa A Rioja
(74) *Attorney, Agent, or Firm* — Oblon, McClelland, Maier & Neustadt, L.L.P.

(57) ABSTRACT

The present invention relates to a process for preparing rigid polyurethane foams or rigid polyisocyanurate foams by using certain polyetherester polyols B) based on aromatic dicarboxylic acids, optionally further polyester polyols C), which differ from those of component B), and polyether polyols D), wherein the mass ratio of total components B) and optionally C) to component D) is less than 1.6. The present invention also relates to the rigid foams thus obtainable and to their use for producing sandwich elements having rigid or flexible outer layers. The present invention further relates to the underlying polyol components.

18 Claims, No Drawings

PREPARING RIGID POLYURETHANE FOAMS

The present invention relates to a process for preparing rigid polyurethane foams or rigid polyisocyanurate foams by using certain polyetherester polyols B) based on aromatic dicarboxylic acids, optionally further polyester polyols C), which differ from those of component B), and polyether polyols D), wherein the mass ratio of total components B) and optionally C) to component D) is less than 1.6. The present invention also relates to the rigid foams thus obtainable and to their use for producing sandwich elements having rigid or flexible outer layers. The present invention further relates to the underlying polyol components.

The production of rigid polyurethane foams by reacting polyisocyanates with relatively high molecular weight compounds having at least two reactive hydrogen atoms, in particular with polyether polyols from alkylene oxide polymerization or polyester polyols from the polycondensation of alcohols with dicarboxylic acids, in the presence of polyurethane catalysts, chain extenders and/or crosslinkers, blowing agents and further auxiliary and addition agents is known and is described in numerous patent and literature publications.

It is known more particularly from the prior art to use polyester polyols which are obtained as polycondensates from aromatic and/or aliphatic dicarboxylic acids and alkanediols and/or -triols, or ether diols. WO 2010/115532 A1 describes the preparation of polyester polyols from terephthalic acid and oligoalkylene oxides, which is said to provide products having improved flame resistance. Fatty acids or fatty acid derivatives are not used in this reference. Low-functional alcohols are used as starters.

When the polyester polyols based on aromatic carboxylic acids or derivatives thereof (e.g. terephthalic acid or phthalic anhydride) are used to produce rigid polyurethane (PU) foams, the high viscosity of the polyester polyols often has a noticeably adverse effect since, as a consequence, the viscosity of the blends with the polyesters increases and as a result mixing of the polyol components with the isocyanate is made significantly more difficult.

In addition, problems with unsatisfactory dimensional stability, i.e., the foam product distorts significantly after removal from the mold or after the pressure section when processed by the double belt process, can occur in certain systems for producing rigid PU foams, for example when using glycerol as relatively high-functionality alcohol component.

The problem of the behavior of rigid PU foams in the event of fire has also not yet been satisfactorily solved for all systems. For example, a toxic compound can form in the event of fire when using trimethylolpropane (TMP) as relatively high-functionality polyester component.

A general problem in the production of rigid PU foams is the formation of surface defects, particularly at the interface with metallic outer layers. These foam surface defects cause formation of an uneven metal surface in sandwich elements and thus often lead to visual unacceptability of the product. An improvement in the foam surface reduces the frequency of the occurrence of such surface defects and thus leads to a visual improvement in the surface of sandwich elements.

Rigid PU foams frequently display high brittleness on cutting with severe evolution of dust and high sensitivity on the part of the foam, and also on sawing where particularly the sawing of composite elements with metallic outer layers and a core of polyurethane or polyisocyanurate foam can lead to crack formation in the foam.

It is further generally desirable to provide systems having a very high self-reactivity in order that the use of catalysts may be minimized.

Prior art rigid PU foams and/or their (constructal) components are unsatisfactory in some aspects concerning their profile in respect of the aforementioned properties. The present invention has for its object to improve the profile in respect of the aforementioned properties.

The invention has more particularly for its object to provide rigid PU foams of low brittleness. The invention further has for its object to provide a polyol component which has a high self-reactivity.

In addition, the viscosity of the compounds used and of the blends prepared therefrom shall be low in order to provide good meterability and mixability in the preparation of rigid PU foams. Furthermore, the solubility of blowing agents, for example the solubility of pentane in the polyol component, should also be very good.

A further object is to improve the dimensional stability of the rigid PU foams. The formation of toxic compounds in the event of fire shall be very low. Furthermore, the formation of surface defects shall be reduced.

As far as the choice of (constructal) components is concerned, the feedstocks used shall be obtainable at very low cost and inconvenience (i.e., inter alia with a minimum of workup and purification steps).

We have found that this object is achieved by a process for preparing rigid polyurethane foams or rigid polyisocyanurate foams comprising the reaction of A) at least one polyisocyanate,
B) at least one polyetherester polyol obtainable by esterification of
   b1) 10 to 70 mol % of a dicarboxylic acid composition comprising
      b11) 50 to 100 mol %, based on the dicarboxylic acid composition, of one or more aromatic dicarboxylic acids or derivatives thereof,
      b12) 0 to 50 mol %, based on said dicarboxylic acid composition b1), of one or more aliphatic dicarboxylic acids or derivatives thereof,
   b2) 2 to 30 mol % of one or more fatty acids or fatty acid derivatives,
   b3) 10 to 70 mol % of one or more aliphatic or cycloaliphatic diols having 2 to 18 carbon atoms or alkoxylates thereof,
   b4) 2 to 50 mol % of a polyether polyol having a functionality of not less than 2, prepared by alkoxylation of a polyol having a functionality of above 2,
   all based on the total amount of components b1) to b4), wherein said components b1) to b4) sum to 100 mol %,
C) optionally further polyester polyols other than those of component B),
D) polyether polyols,
E) optionally flame retardants,
F) one or more blowing agents,
G) catalysts, and
H) optionally further auxiliaries or addition agents,
wherein the mass ratio of total components B) and optionally C) to component D) is less than 1.6.

The present invention also provides a polyol component comprising the aforementioned components B) to H), wherein the mass ratio of total components B) and optionally C) to component D) is below 1.6.

The present invention further provides rigid polyurethane foams and rigid polyisocyanurate foams obtainable by the process of the present invention and also for their use for preparing sandwich elements having rigid or flexible outer layers.

The invention will now be more particularly elucidated. Combinations of preferred embodiments are not outside the scope of the present invention. This holds particularly for those embodiments of individual components A) to H) of the present invention which are characterized as preferred. The embodiments recited hereinbelow in the context of component B) to H) apply not only to the process of the present invention and to the rigid foams thus obtainable but also to the polyol components of the present invention.

Component B

In the context of the present disclosure, the terms "polyester polyol" and "polyesterol" are synonymous as are the terms "polyether polyol" and "polyetherol".

Preferably, the component b11) comprises at least one compound selected from the group consisting of terephthalic acid, dimethyl terephthalate (DMT), polyethylene terephthalate (PET), phthalic acid, phthalic anhydride (PA) and isophthalic acid. More preferably, the component b11) comprises at least one compound from the group consisting of terephthalic acid, dimethyl terephthalate (DMT), polyethylene terephthalate (PET) and phthalic anhydride (PA). Even more preferably, the component b11) comprises phthalic anhydride, dimethyl terephthalate (DMT), terephthalic acid or mixtures thereof. The aromatic dicarboxylic acids or their derivatives in component b11) are more preferably selected from the aforementioned aromatic dicarboxylic acids, and dicarboxylic acid derivatives, respectively, and specifically from terephthalic acid and/or dimethyl terephthalate (DMT). Terephthalic acid and/or DMT in component b11) leads to polyetheresters B) having particularly good fire protection properties. Terephthalic acid is very particularly preferable since, in contrast to DMT, the formation of disruptive elimination products can be avoided.

The proportion in which aliphatic dicarboxylic acids or aliphatic dicarboxylic acid derivatives (component b12)) are comprised in dicarboxylic acid composition b1) is generally in the range from 0 to 30 mol % and preferably in the range from 0 to 10 mol %. It is particularly preferable for the dicarboxylic acid composition b1) not to contain any aliphatic dicarboxylic acids or derivatives thereof and thus to consist to an extent of 100 mol % of one or more aromatic dicarboxylic acids or their derivatives, in which case the aforementioned ones are preferred.

The amounts in which component b2) is used are preferably in the range from 3 to 20 mol % and more preferably in the range from 5 to 18 mol %.

The amounts in which component b3) is used are preferably in the range from 20 to 60 mol %, more preferably in the range from 25 to 55 mol % and even more preferably in the range from 30 to 45 mol %.

The amounts in which component b4) is used are preferably in the range from 2 to 40 mol %, more preferably in the range from 2 to 35 mol % and even more preferably in the range from 15 to 25 mol %.

In one embodiment of the invention, the fatty acid or fatty acid derivative b2) consists of a fatty acid or fatty acid mixture, one or more glycerol esters of fatty acids or of fatty acid mixtures, and/or one or more fatty acid monoesters, for example biodiesel or methyl esters of fatty acids; component b2) more preferably consists of a fatty acid or fatty acid mixture and/or one or more fatty acid monoesters; component b2) even more preferably consists of a fatty acid or fatty acid mixture and/or biodiesel; and component b2) yet even more preferably consists of a fatty acid or fatty acid mixture.

In a preferred embodiment of the invention, the fatty acid or fatty acid derivative b2) is selected from the group consisting of castor oil, polyhydroxy fatty acids, ricinoleic acid, stearic acid, hydroxyl-modified oils, grapeseed oil, black cumin oil, pumpkin kernel oil, borage seed oil, soybean oil, wheat germ oil, rapeseed oil, sunflower oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, animal tallow, such as beef tallow, fatty acids, hydroxyl-modified fatty acids, biodiesel, methyl esters of fatty acids and fatty acid esters based on myristoleic acid, palmitoleic acid, oleic acid, vaccenic acid, petroselic acid, gadoleic acid, erucic acid, nervonic acid, linoleic acid, α- and γ-linolenic acid, stearidonic acid, arachidonic acid, timnodonic acid, clupanodonic acid and cervonic acid, and also mixed fatty acids.

In a particularly preferred embodiment of the present invention, the fatty acid or fatty acid derivative b2) is oleic acid, biodiesel, soybean oil, rapeseed oil or tallow, more preferably oleic acid biodiesel, soybean oil, rapeseed oil or beef tallow, even more preferably oleic acid or biodiesel and yet even more preferably oleic acid. The fatty acid or the fatty acid derivative generally serves to improve the blowing agent solubility in the production of rigid polyurethane foams.

It is very particularly preferable for component b2) not to comprise any triglyceride, especially no oil or fat. The glycerol released from the triglyceride by the esterification/transesterification has, as mentioned above, a deleterious effect on the dimensional stability of rigid foam. Preferred fatty acids and fatty acid derivatives in the context of component b2) are hence the fatty acids themselves and also alkyl monoesters of fatty acids and alkyl monoesters of fatty acid mixtures, especially the fatty acids themselves and/or biodiesel.

Preferably the aliphatic or cycloaliphatic diol b3) is selected from the group consisting of ethylene glycol, diethylene glycol, propylene glycol, 1,3-propanediol, 1,4-butanediol, 1,5-pentanediol, 1,6-hexanediol, 2-methyl-1,3-propanediol and 3-methyl-1,5-pentanediol and alkoxylates thereof. It is particularly preferable for the aliphatic diol b3) to be monoethylene glycol or diethylene glycol, especially diethylene glycol.

Preferably, such a polyether polyol b4) is used having a functionality above 2, which was prepared by alkoxylating a polyol having a functionality of not less than 3.

According to the invention, the polyether polyol b4) has a functionality greater than 2. It preferably has a functionality of not less than 2.7 and especially of not less than 2.9. In general, it has a functionality of not more than 6, preferably not more than 5 and more preferably not more than 4.

In one embodiment of the present invention, the polyether polyol b4) is obtainable by reacting a polyol having a functionality of greater than 2 with ethylene oxide and/or propylene oxide, preferably with ethylene oxide.

In a further preferable embodiment, the polyether polyol b4) is obtainable by alkoxylating a polyol selected from the group consisting of sorbitol, pentaerythritol, trimethylolpropane, glycerol, polyglycerol and mixtures thereof.

In one particularly preferable embodiment, the polyether polyol b4) is obtainable by alkoxylation with ethylene oxide, leading to rigid polyurethane foams having improved fire protection properties.

In one preferred embodiment of the present invention, the component b4) is prepared by anionic polymerization of propylene oxide or ethylene oxide, preferably ethylene oxide, in the presence of alkoxylation catalysts, such as alkali metal hydroxides, such as sodium hydroxide or potassium hydroxide, or alkali metal alkoxides, such as sodium methoxide, sodium ethoxide, potassium ethoxide or potassium isopropoxide, or aminic alkoxylation catalysts, such as dimethylethanolamine (DMEOA), imidazole and imidazole derivatives and also mixtures thereof by using at least one starter molecule. KOH and aminic alkoxylation catalysts are preferred alkoxylation catalysts. Since the polyether first has to be neutralized when KOH is used as alkoxylation catalyst and the potassium salt produced has to be removed before the polyether can be used in the esterification as component b4), the use of aminic alkoxylation catalysts is preferred. Preferred aminic alkoxylation catalysts are selected from the group comprising dimethylethanolamine (DMEOA), imidazole and imidazole derivatives and also mixtures thereof, more preferably imidazole.

In one advantageous embodiment of the invention, the polyether polyol b4) consists of the reaction product of glycerol with ethylene oxide and/or propylene oxide, preferably with ethylene oxide. As result, the storage stability of component B) is particularly high.

In a further advantageous embodiment of the invention, the polyether polyol b4) consists of the reaction product of trimethylolpropane with ethylene oxide and/or propylene oxide, preferably with ethylene oxide. Again the result is a particularly improved storage stability for component B).

Preferably, the polyether polyol b4) has an OH number in the range from 150 to 1250 mg KOH/g, preferably in the range from 300 to 950 mg KOH/g and more preferably in the range from 500 to 800 mg KOH/g.

In a particularly preferred embodiment of the invention, the polyether polyol b4) consists of the reaction product of trimethylolpropane or glycerol, preferably glycerol, with ethylene oxide, the OH number of the polyether polyol b4) is in the range from 500 to 650 mg KOH/g, and KOH or imidazole, preferably imidazole is used as alkoxylation catalyst.

In an especially preferred embodiment of the invention, the polyether polyol b4) consists of the reaction product of trimethylolpropane or glycerol, preferably glycerol, with ethylene oxide, the OH number of the polyether polyol b4) is in the range from 500 to 650 mg KOH/g, imidazole is used as alkoxylation catalyst, and the aliphatic or cycloaliphatic diol b3) is diethylene glycol, and the fatty acid or the fatty acid derivative is oleic acid.

The amount of component b4) used per kg of polyetherester polyol B) is preferably not less than 200 mmol, more preferably not less than 400 mmol, even more preferably not less than 600 mmol, yet even more preferably not less than 800 mmol and most preferably not less than 1000 mmol.

Preferably, the polyetherester polyol B) has a number-weighted average functionality of not less than 2, preferably of greater than 2, more preferably greater than 2.2 and especially greater than 2.3, leading to a higher crosslink density on the part of the polyurethane prepared therewith and hence to better mechanical properties on the part of the polyurethane foam.

To prepare the polyetherester polyols, the aliphatic and aromatic polycarboxylic acids and/or derivatives and polyhydric alcohols can be polycondensed in the absence of catalysts or preferably in the presence of esterification catalysts, advantageously in an atmosphere of inert gas, e.g. nitrogen, in the melt at temperatures of from 150 to 280° C., preferably from 180 to 260° C., optionally under reduced pressure, to the desired acid number which is advantageously less than 10, preferably less than 2. In a preferred embodiment, the esterification mixture is polycondensed at the abovementioned temperatures to an acid number of from 80 to 20, preferably from 40 to 20, under atmospheric pressure and subsequently under a pressure of less than 500 mbar, preferably from 40 to 400 mbar. Possible esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene in order to distill off the water of condensation as an azeotrope.

To prepare the polyetherester polyols, the organic polycarboxylic acids and/or derivatives and polyhydric alcohols are advantageously polycondensed in a molar ratio of 1:1-2.2, preferably 1:1.05-2.1 and particularly preferably 1:1.1-2.0.

The polyester polyols obtained generally have a number average molecular weight in the range from 300 to 3000, preferably in the range from 400 to 1000 and especially in the range from 450 to 800.

The proportion of polyetherester polyols B) according to the present invention is generally at least 10 wt %, preferably at least 20 wt % and more preferably at least 25 wt %, based on total components B) to H).

To produce the rigid polyurethane foams by the process of the invention, use is made of, in addition to the above-described specific polyester polyols, the constructal components which are known per se, about which the following details may be provided.

Component A

Polyisocyanate for the purposes of the present invention is to be understood to be referring to an organic compound comprising at least two reactive isocyanate groups per molecule, i.e., the functionality is at least 2. When the polyisocyanates used or a mixture of two or more polyisocyanates do not have a unitary functionality, the number-weighted average functionality of component A) used is at least 2.

The aliphatic, cycloaliphatic, araliphatic polyfunctional isocyanates known per se and preferably the aromatic polyfunctional isocyanates come into consideration for use as polyisocyanates A). Polyfunctional isocyanates of this type are known per se or are obtainable by methods known per se. Polyfunctional isocyanates may more particularly also be used as mixtures, in which case component A) will comprise various polyfunctional isocyanates. Polyfunctional isocyanates that come into consideration for use as polyisocyanate have two (hereinafter called diisocyanates) or more than two isocyanate groups per molecule.

Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate, and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures and preferably aromatic polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates.

Of particular suitability are 2,2'-, 2,4'- and/or 4,4'-diphenylmethane diisocyanate (MDI), 1,5-naphthylene diisocyanate (NDI), 2,4- and/or 2,6-tolylene diisocyanate (TDI), 3,3'-dimethylbiphenyl diisocyanate, 1,2-diphenylethane diisocyanate and/or p-phenylene diisocyanate (PPDI), tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or -2,6-cyclohexane diisocyanate and 4,4'-, 2,4'- and/or 2,2'-dicyclohexylmethane diisocyanate.

Modified polyisocyanates are also frequently used, i.e., products which are obtained by chemical reaction of organic polyisocyanates and which have at least two reactive isocyanate groups per molecule. Polyisocyanates comprising ester, urea, biuret, allophanate, carbodiimide, isocyanurate, uretdione, carbamate and/or urethane groups may be mentioned in particular.

The following embodiments are particularly preferable for use as polyisocyanates of component A):
i) Polyfunctional isocyanates based on tolylene diisocyanate (TDI), especially 2,4-TDI or 2,6-TDI or mixtures of 2,4- and 2,6-TDI;
ii) Polyfunctional isocyanates based on diphenylmethane diisocyanate (MDI), especially 2,2'-MDI or 2,4'-MDI or 4,4'-MDI or oligomeric MDI, which is also known as polyphenyl polymethylene isocyanate, or mixtures of two or three of the aforementioned diphenylmethane diisocyanates, or crude MDI, which is generated in the production of MDI, or mixtures of at least one oligomer of MDI and at least one of the aforementioned low molecular weight MDI derivatives;
iii) Mixtures of at least one aromatic isocyanate of embodiment i) and at least one aromatic isocyanate of embodiment ii).

Polymeric diphenylmethane diisocyanate is very particularly preferred for use as polyisocyanate. Polymeric diphenylmethane diisocyanate (hereinafter called polymeric MDI) is a mixture of two-nuclear MDI and oligomeric condensation products and thus derivatives of diphenylmethane diisocyanate (MDI). The polyisocyanates may preferably also be constructed from mixtures of monomeric aromatic diisocyanates and polymeric MDI.

Polymeric MDI in addition to two-nuclear MDI comprises one or more polynuclear condensation products of MDI with a functionality of more than 2, especially 3 or 4 or 5. Polymeric MDI is known and is frequently referred to as polyphenyl polymethylene isocyanate or else as oligomeric MDI. Polymeric MDI is typically constructed from a mixture of MDI-based isocyanates of differing functionality. Polymeric MDI is typically used in admixture with monomeric MDI.

The (average) functionality of a polyisocyanate comprising polymeric MDI can vary in the range from about 2.2 to about 5, more particularly from 2.3 to 4, more particularly from 2.4 to 3.5. Such a mixture of MDI-based polyfunctional isocyanates having different functionalities is especially the crude MDI obtained as intermediate in the production of MDI.

Polyfunctional isocyanates or mixtures of two or more polyfunctional isocyanates based on MDI are known and are for example marketed by BASF Polyurethanes GmbH under the name of Lupranat®.

The functionality of component A) is preferably at least two, especially at least 2.2 and more preferably at least 2.4. The functionality of component A) is preferably in the range from 2.2 to 4 and more preferably in the range from 2.4 to 3.

The content of isocyanate groups in component A) is preferably in the range from 5 to 10 mmol/g, especially in the range from 6 to 9 mmol/g, and more preferably in the range from 7 to 8.5 mmol/g. A person skilled in the art knows that the content of isocyanate groups in mmol/g and the so-called equivalence weight in g/equivalent are reciprocal to each other. The content of isocyanate groups in mmol/g follows from the content in wt % to ASTM D-5155-96 A.

In a particularly preferred embodiment, component A) consists of at least one polyfunctional isocyanate selected from 4,4'-diphenylmethane diisocyanate, 2,4'-diphenylmethane diisocyanate, 2,2'-diphenylmethane diisocyanate and oligomeric diphenylmethane diisocyanate. In the context of this preferred embodiment, component (al) comprises oligomeric diphenylmethane diisocyanate with particular preference and has a functionality of at least 2.4.

The viscosity of component A) used can vary within wide limits. The viscosity of component A) is preferably in the range from 100 to 3000 mPa·s and more preferably in the range from 200 to 2500 mPa·s.

Component C

Suitable polyester polyols C), which differ from the polyester polyols B), are obtainable from organic dicarboxylic acids having 2 to 12 carbon atoms, preferably aromatic ones, or mixtures of aromatic and aliphatic dicarboxylic acids and polyhydric alcohols, preferably diols, having 2 to 12 carbon atoms, preferably 2 to 6 carbon atoms.

Possible dicarboxylic acids are in particular: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. It is also possible to use the corresponding dicarboxylic acid derivatives, e.g. dicarboxylic esters of alcohols having from 1 to 4 carbon atoms or dicarboxylic anhydrides, in place of the free dicarboxylic acids. As aromatic dicarboxylic acids, preference is given to using phthalic acid, phthalic anhydride, terephthalic acid and/or isophthalic acid as a mixture or alone. As aliphatic dicarboxylic acids, preference is given to using dicarboxylic acid mixtures of succinic, glutaric and adipic acid in weight ratios of, for example, 20-35: 35-50: 20-32 and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol, trimethylolpropane and pentaerythritol. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, e.g. ε-caprolactone, or hydroxycarboxylic acids, e.g. ω-hydroxycaproic acid.

To prepare the further polyester polyols C), bio-based starting materials and/or derivatives thereof are also suitable, for example, castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, fatty acids, hydroxy-modified fatty acids and fatty acid esters based on myristoleic acid, palmitoleic acid, oleic acid, vaccenic acid, petroselic acid, gadoleic acid, erucic acid, nervonic acid, linoleic acid, α- and γ-linolenic acid, stearidonic acid, arachidonic acid, timnodonic acid, clupanodonic acid and cervonic acid.

In general, the mass ratio of polyetherester polyols B) to polester polyols C) is at least 0.1, preferably at least 0.25, more preferably at least 0.5 and especially at least 0.8. Preferably, the proportion of total polyester polyols B) and C) which is attributable to polyetherester polyols B) is generally at least 25 wt %, preferably at least 50 wt %, more preferably at least 75 wt % and especially 100 wt %. It is particularly preferable when no further polyester polyols C) are reacted.

Component D

According to the present invention, polyether polyols D) are used for preparing rigid PU foams. The polyether polyols D) are obtainable by known processes, for example by anionic polymerization of one or more alkylene oxides having 2 to 4 carbon atoms with alkali metal hydroxides, such as sodium hydroxide or potassium hydroxide, alkali metal alkoxides, such as sodium methoxide, sodium ethoxide, potassium ethoxide or potassium isopropoxide, or aminic alkoxylation catalysts such as dimethylethanolamine (DMEOA), imidazole or imidazole derivatives by using at least one starter molecule or starter molecule mixture comprising on average from 2 to 8 and preferably from 2 to 6 reactive hydrogen atoms in bonded form, or by cationic polymerization with Lewis acids, such as antimony pentachloride, boron fluoride etherate or bleaching earth.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Preferred alkylene oxides are propylene oxide and ethylene oxide.

Possible starter molecules are, for example: water, organic dicarboxylic acids, such as succinic acid, adipic acid, phthalic acid and terephthalic acid, aliphatic and aromatic, optionally N-monoalkyl-, N,N-dialkyl- and N,N'-dialkyl-substituted diamines having from 1 to 4 carbon atoms in the alkyl radical, e.g. optionally monoalkyl- and dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane. Particular preference is given to the recited diprimary amines, for example ethylenediamine.

Further possible starter molecules are: alkanolamines such as ethanolamine, N-methylethanolamine and N-ethylethanolamine, dialkanolamines, such as diethanolamine, N-methyldiethanolamine and N-ethyldiethanolamine and trialkanolamines, such as triethanolamine, and ammonia.

Preference is given to using dihydric or polyhydric alcohols (also called "starters") such as ethanediol, 1,2- and 1,3-propanediol, diethylene glycol (DEG), dipropylene glycol, 1,4-butanediol, 1,6-hexanediol, glycerol, trimethylolpropane, pentaerythritol, sorbitol and sucrose. Particular preference is given to the use of a starter mixture of sucrose and DEG or sucrose and glycerol, specifically sucrose and glycerol.

The polyether polyols D), preferably polyoxypropylene polyols and polyoxyethylene polyols, have a functionality of preferably from 2 to 6 and in particular from 2 to 5 and number average molecular weights of from 150 to 3000, preferably from 200 to 2000 and in particular from 250 to 1000.

One preferable embodiment of the invention utilizes an alkoxylated diol, preferably an ethoxylated diol, for example polyethylene glycol, as one part of polyether polyol D).

In a preferred embodiment of the invention, said polyetherol component D) consists of a polyetherol mixture in which some of polyetherol component D) was prepared on the basis of propylene oxide (polyetherol component D1) and the remainder of polyetherol component D) was prepared on the basis of ethylene oxide (polyetherol component D2).

In a preferred embodiment of the invention, said polyetherol component D1) has an average OH functionality of above 3, preferably above 3.5 and more preferably above 4 and an OH number above 300 mg KOH/g preferably above 350 mg KOH/g, more preferably above 400 mg KOH/g and specifically above 450 mg KOH/g.

In a preferred embodiment of the invention, said polyetherol component D1) has an average OH functionality of below 6, preferably below 5.5 and more preferably below 5 and an OH number below 600 mg KOH/g preferably below 550 mg KOH/g and more preferably below 500 mg KOH/g.

In a preferred embodiment of the invention, the proportion of the total amount of polyetherol component (D) which is attributable to the polyetherol component D1) is above 65 wt %, preferably above 70 wt %, more preferably above 75 wt %, especially above 80 wt % and specifically above 85 wt %.

In a preferred embodiment of the invention, the polyetherol component D1) is not based on sorbitol.

In a preferred embodiment of the invention, the polyetherol component D1) is based on a polyether prepared from propylene oxide and a starter mixture of sucrose and glycerol or sucrose and DEG, preferably sucrose and glycerol.

In a preferred embodiment of the invention, the polyetherol component D2) is based on a polyetherol based on ethylene oxide having an average OH functionality of not more than 3, preferably the functionality of polyetherol component D2) is equal to 2 and the OH number of polyetherol component D2) is below 400 mg KOH/g, preferably below 300 mg KOH/g and more preferably below 200 mg KOH/g.

In a particularly preferred embodiment of the invention, the polyetherol component D) consists of two polyethers, a polyether (polyetherol component D1) based on propylene oxide and a starter mixture of sucrose and glycerol having an average OH functionality of above 4 and below 5 and an OH number of above 450 mg KOH/g and below 500 mg KOH/g and also a polyethylene glycol having an OH number below 200 mg KOH/g (polyetherol component D2).

The proportion of polyether polyols D) is generally in the range from 25 to 55 wt %, preferably in the range from 29 to 45 wt %, more preferably in the range from 31 to 43 wt %, more specifically in the range from 33 to 42 wt % and especially in the range from 35 to 40 wt %, based on total components B) to H).

According to the present invention, the mass ratio of total components B) and C) to component D) is less than 1.6, especially below 1.5 or 1.4, preferably less than 1.3, more preferably less than 1.2, especially preferably less than 1.1, specifically preferably less than 1 and most preferably less than 0.8.

Furthermore, the mass ratio according to the present invention for total components B) and C) to component D) is greater than 0.1, especially greater than 0.2, preferably greater than 0.4, more preferably greater than 0.5 and most preferably greater than 0.6.

Component E

As flame retardants E), it is generally possible to use the flame retardants known from the prior art. Suitable flame retardants are, for example, brominated esters, brominated ethers (Ixol) or brominated alcohols such as dibromoneopentyl alcohol, tribromoneopentyl alcohol and PHT-4-diol and also chlorinated phosphates such as tris(2-chloroethyl) phosphate, tris(2-chloropropyl)phosphate (TCPP), tris(1,3-dichloropropyl)phosphate, tricresyl phosphate, tris(2,3-dibromo-propyl)phosphate, tetrakis(2-chloroethyl) ethylenediphosphate, dimethyl methanephosphonate, diethyl diethanolaminomethylphosphonate and also commercial halogen-comprising flame retardant polyols. By way of further phosphates or phosphonates it is possible to use diethyl ethanephosphonate (DEEP), triethyl phosphate (TEP), dimethyl propylphosphonate (DMPP), diphenyl cresyl phosphate (DPK) as liquid flame retardants.

Apart from the abovementioned flame retardants, it is also possible to use inorganic or organic flame retardants such as red phosphorus, preparations comprising red phosphorus, aluminum oxide hydrate, antimony trioxide, arsenic oxide, ammonium polyphosphate and calcium sulfate, expandable graphite or cyanuric acid derivatives such as melamine, or mixtures of at least two flame retardants, e.g. ammonium polyphosphates and melamine and optionally maize starch or ammonium polyphosphate, melamine, expandable graphite and optionally aromatic polyesters for making the rigid polyurethane foams flame resistant.

Preferred flame retardants have no isocyanate-reactive groups. The flame retardants are preferably liquid at room temperature. Particular preference is given to TCPP, DEEP, TEP, DMPP and DPK, especially TCPP.

The proportion of flame retardant E) is generally in the range from 10 to 40 wt %, preferably in the range from 15 to 30 wt % and more preferably in the range from 20 to 25 wt %, based on components B) to H).

Component F

Blowing agents F) which are used for producing the rigid polyurethane foams include preferably water, formic acid and mixtures thereof. These react with isocyanate groups to form carbon dioxide and in the case of formic acid carbon dioxide and carbon monoxide. In addition, physical blowing agents such as low-boiling hydrocarbons can be used. Suitable physical blowing agents are liquids which are inert towards the polyisocyanates A) and have boiling points below 100° C., preferably below 50° C., at atmospheric pressure, so that they vaporize under the conditions of the exothermic polyaddition reaction. Examples of such liquids which can preferably be used are alkanes such as heptane, hexane, n-pentane and isopentane, preferably industrial mixtures of n-pentane and isopentane, n-butane and isobutane and propane, cycloalkanes such as cyclopentane and/or cyclohexane, ethers such as furan, dimethyl ether and diethyl ether, ketones such as acetone and methyl ethyl ketone, alkyl carboxylates such as methyl formate, dimethyl oxalate and ethyl acetate and halogenated hydrocarbons such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. Mixtures of these low-boiling liquids with one another and/or with other substituted or unsubstituted hydrocarbons can also be used. Organic carboxylic acids such as formic acid, acetic acid, oxalic acid, ricinoleic acid and carboxyl-containing compounds are also suitable.

It is preferable not to use formic acid or any halogenated hydrocarbons as blowing agent. It is preferable to use water, any pentane isomer and also mixtures of water and pentane isomers.

The blowing agents are either wholly or partly dissolved in the polyol component (i.e. B+C+D+E+F+G+H) or are introduced via a static mixer immediately before foaming of the polyol component. It is usual for water or formic acid to be fully or partially dissolved in the polyol component and the physical blowing agent (for example pentane) and any remainder of the chemical blowing agent to be introduced "on-line".

The polyol component is admixed in situ with pentane, possibly some of the chemical blowing agent and also with all or some of the catalyst. Auxiliary and addition agents as well as flame retardants are already comprised in the polyol blend.

The amount of blowing agent or blowing agent mixture used is in the range from 1 to 30 wt %, preferably in the range from 3 to 15 wt % and more preferably in the range from 5 to 10 wt %, all based on total components B) to H).

When water is used as blowing agent, it is preferably added to the polyol component (B+C+D+E+F+G+H) in an amount of 0.2 to 10 wt %, based on component B). The addition of water can take place in combination with the use of other blowing agents described. Preference is given to using water combined with pentane.

Component G

Catalysts G) used for preparing the rigid polyurethane foams are particularly compounds which substantially speed the reaction of the components B) to H) compounds comprising reactive hydrogen atoms, especially hydroxyl groups, with the polyisocyanates A).

It is advantageous to use basic polyurethane catalysts, for example tertiary amines such as triethylamine, tributylamine, dimethylbenzylamine, dicyclohexylmethylamine, dimethylcyclohexylamine, N,N,N',N'-tetramethyldiaminodiethyl ether, bis(dimethylaminopropyl)urea, N-methylmorpholine or N-ethylmorpholine, N-cyclohexylmorpholine, N,N,N',N'-tetramethylethylenediamine, N,N,N,N-tetramethylbutanediamine, N,N,N,N-tetramethylhexane-1,6-diamine, pentamethyldiethylenetriamine, bis(2-dimethylaminoethyl)ether, dimethylpiperazine, N-dimethylaminoethylpiperidine, 1,2-dimethylimidazole, 1-azabicyclo-[2.2.0]octane, 1,4-diazabicyclo[2.2.2]octane (Dabco) and alkanolamine compounds, such as triethanolamine, triisopropanolamine, N-methyldiethanolamine and N-ethyldiethanolamine, dimethylaminoethanol, 2-(N,N-dimethylaminoethoxy)ethanol, N,N',N"-tris(dialkylaminoalkyl)hexahydrotriazines, e.g. N,N',N"-tris(dimethylaminopropyl)-s-hexahydrotriazine, and triethylenediamine. However, metal salts such as iron(II) chloride, zinc chloride, lead octoate and preferably tin salts such as tin dioctoate, tin diethylhexoate and dibutyltin dilaurate and also, in particular, mixtures of tertiary amines and organic tin salts are also suitable.

Further possible catalysts are: amidines such as 2,3-dimethyl-3,4,5,6-tetrahydropyrimidine, tetraalkylammonium hydroxides such as tetramethylammonium hydroxide, alkali metal hydroxides such as sodium hydroxide and alkali metal alkoxides such as sodium methoxide and potassium isopropoxide, alkali metal carboxylates and also alkali metal salts of long-chain fatty acids having from 10 to 20 carbon atoms and optionally lateral OH groups. Preference is given to using from 0.001 to 10% by weight of catalyst or catalyst combination, based (i.e., reckoned) on 100 parts by weight of the component B). It is also possible to allow the reactions to proceed without catalysis. In this case, the catalytic activity of amine-initiated polyols is exploited.

When, during foaming, a polyisocyanate excess is used, further suitable catalysts for the trimerization reaction of the excess NCO groups with one another are: catalysts which form isocyanurate groups, for example ammonium ion salts or alkali metal salts, specifically ammonium or alkali metal carboxylates, either alone or in combination with tertiary amines. Isocyanurate formation leads to flame-resistant PIR foams which are preferably used in industrial rigid foam, for example in building and construction as insulation boards or sandwich elements.

In a preferred embodiment of the invention, one part of component G) consists of a carboxylate salt, specifically an alkali metal carboxylate.

Further information regarding the abovementioned and further starting materials may be found in the technical literature, for example Kunststoffhandbuch, Volume VII, Polyurethane, Carl Hanser Verlag Munich, Vienna, 1st, 2nd and 3rd Editions 1966, 1983 and 1993.

Component H

Further auxiliaries and/or addition agents H) can optionally be added to the reaction mixture for producing the rigid polyurethane foams. Mention may be made of, for example, surface-active substances, foam stabilizers, cell regulators, fillers, dyes, pigments, hydrolysis inhibitors, fungistatic and bacteriostatic substances.

Possible surface-active substances are, for example, compounds which serve to aid homogenization of the starting materials and may also be suitable for regulating the cell structure of the polymers. Mention may be made of, for example, emulsifiers such as the sodium salts of castor oil sulfates or of fatty acids and also salts of fatty acids with amines, e.g. diethylamine oleate, diethanolamine stearate, diethanolamine ricinoleate, salts of sulfonic acids, e.g. alkali metal or ammonium salts of dodecylbenzenesulfonic or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or for stabilizing the foam. The surface-active substances are typically employed in amounts of 0.01 to 10 parts by weight, based (i.e., reckoned) on 100 parts by weight of component B).

For the purposes of the present invention, fillers, in particular reinforcing fillers, are the customary organic and inorganic fillers, reinforcing materials, weighting agents, agents for improving the abrasion behavior in paints, coating compositions, etc., which are known per se. Specific examples are: inorganic fillers such as siliceous minerals, for example sheet silicates such as antigorite, serpentine, hornblendes, amphiboles, chrisotile and talc, metal oxides such as kaolin, aluminum oxides, titanium oxides and iron oxides, metal salts, such as chalk, barite and inorganic pigments such as cadmium sulfide and zinc sulfide and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various length, which may be coated with a size. Possible organic fillers are, for example: carbon, melamine, rosin, cyclopentadienyl resins and graft polymers and also cellulose fibers, polyamide, polyacrylonitrile, polyurethane, polyester fibers based on aromatic and/or aliphatic dicarboxylic esters and in particular carbon fibers.

The inorganic and organic fillers can be used individually or as mixtures and are advantageously added to the reaction mixture in amounts of from 0.5 to 50 wt %, preferably from 1 to 40 wt %, based on the weight of the components A) to H), although the content of mats, nonwovens and woven fabrics of natural and synthetic fibers can reach values of up to 80 wt %, based on the weight of components A) to H).

Further information regarding the abovementioned other customary auxiliary and addition agents may be found in the technical literature, for example the monograph by J. H. Saunders and K. C. Frisch "High Polymers" Volume XVI, Polyurethanes, Parts 1 and 2, Interscience Publishers 1962 and 1964, or Kunststoff-Handbuch, Polyurethane, Volume VII, Hanser-Verlag, Munich, Vienna, 1st and 2nd Editions, 1966 and 1983.

The present invention further provides a polyol component comprising
  10 to 50 wt % of polyetherester polyols B),
  0 to 30 wt % of further polyester poylols C),
  25 to 55 wt % of polyether polyols D),
  10 to 40 wt % of flame retardants E),
  1 to 30 wt % of blowing agents F),
  0.5 to 10 wt % of catalysts G), and
  0 to 20 wt %, especially 0.5 to 20 wt %, of further auxiliary and addition agents H),
each as defined above and each based on the total weight of components B) to H), wherein the wt % add up to 100 wt %, and wherein the mass ratio of total components B) and C) to component D) is less than 1.6.

It is particularly preferable for the polyol component to comprise
  25 to 40 wt % of polyetherester polyols B),
  0 wt % of further polyester poylols C),
  29 to 45 wt % of polyether polyols D),
  15 to 30 wt % of flame retardants E),
  3 to 15 wt % of blowing agents F),
  0.5 to 10 wt % of catalysts G),
  0.5 to 5 wt % of further auxiliary and addition agents H),
each as defined above and each based on the total weight of components B) to H), wherein the wt % add up to 100 wt %, and wherein the mass ratio of total components B) and C) to component D) is less than 1.3.

The mass ratio of total components B) and C) to component D) in the polyol components of the present invention is preferably greater than 0.1, more particularly greater than 0.2, more preferably greater than 0.4, even more preferably greater than 0.5 and most preferably greater than 0.6.

To produce the rigid polyurethane foams of the present invention, the polyisocyanates A), the specific polyester polyols B) of the present invention, optionally the further polyester polyol C), the polyetherols D) and the further components E) to H) are mixed in such amounts that, in the reaction, the equivalence ratio of NCO groups on polyisocyanates A) to total reactive hydrogen atoms on component B), optionally C) and also D) to H), is in the range from 1 to 3.5:1, preferably in the range from 1 to 2.5:1, more preferably in the range from 1.1 to 2.1:1, even more preferably in the range from 1.2 to 2.0:1, especially in the range from 1.3 to 1.9:1, more specifically in the range from 1.4 to 1.8:1 and advantageously in the range from 1.4 to 1.7:1.

The molar ratio of NCO groups on polyisocyanates A) to total reactive hydrogen atoms on components B), optionally C), and D) to H) is preferably greater than 1.0:1, preferably above 1.1:1, more preferably above 1.2:1, especially above 1.3:1 and specifically above 1.4:1.

The examples which follow illustrate the invention.

EXAMPLES

The following polyester polyols (polyesterol 1, polyesterol 3 and polyesterol 5) and polyetherester polyols (polyesterol 2, polyesterol 4, polyesterol 6 and polyesterol 7) were used:

Polyesterol 1 (comparator): esterification product of terephthalic acid (34 mol %), oleic acid (9 mol %), diethylene glycol (40 mol %) and glycerol (17 mol %) having a hydroxyl functionality of 2.3, a hydroxyl number of 244 mg KOH/g and an oleic acid content in the polyesterol of 20% by weight.

Polyesterol 2 (invention): esterification product of terephthalic acid (31 mol %), oleic acid (8 mol %), diethylene glycol (43 mol %) and a polyether (18 mol %) based on glycerol and ethylene oxide having an OH functionality of 3 and a hydroxyl number of 546 mg KOH/g, prepared in the presence of imidazole as alkoxylation catalyst. This polyether was not worked up before being used in the subsequent esterification. The polyesterol has a hydroxyl functionality of 2.3, a hydroxyl number of 239 mg KOH/g and an oleic acid content in the polyesterol of 15% by weight.

Polyesterol 3 (comparator): esterification product of phthalic anhydride (30 mol %), oleic acid (12 mol %), diethylene glycol (40 mol %) and trimethylolpropane (18 mol %) having a hydroxyl functionality of 2.2, a hydroxyl number of 249 mg KOH/g and an oleic acid content in the polyesterol of 25% by weight.

Polyesterol 4 (invention): esterification product of phthalic anhydride (25 mol %), oleic acid (15 mol %), diethylene glycol (37 mol %) and a polyether (23 mol %) based on trimethylolpropane and ethylene oxide having an OH functionality of 3 and a hydroxyl number of 610 mg KOH/g, prepared in the presence of KOH as alkoxylation catalyst with subsequent neutralization and removal of the potassium salt formed. The polyesterol has a hydroxyl functionality of 2.2, a hydroxyl number of 244 mg KOH/g and an oleic acid content in the polyesterol of 24% by weight.

Polyesterol 5 (comparator): esterification product of terephthalic acid (35 mol %), oleic acid (7 mol %), diethylene glycol (40 mol %) and glycerol (18 mol %) having a hydroxyl functionality of 2.5, a hydroxyl number of 256 mg KOH/g and an oleic acid content in the polyesterol of 16% by weight.

Polyesterol 6 (invention): esterification product of terephthalic acid (29 mol %), oleic acid (10 mol %), diethylene glycol (36 mol %) and a polyether (25 mol %) based on glycerol and ethylene oxide having an OH functionality of 3 and a hydroxyl number of 535 mg KOH/g, prepared in the presence of KOH as alkoxylation catalyst with subsequent neutralization and removal of the potassium salt formed. The polyesterol has a hydroxyl functionality of 2.5, a hydroxyl number of 245 mg KOH/g and an oleic acid content in the polyesterol of 15% by weight.

Polyesterol 7 (invention): esterification product of terephthalic acid (29 mol %), oleic acid (10 mol %), diethylene glycol (36 mol %) and a polyether (25 mol %) based on glycerol and ethylene oxide having an OH functionality of 3 and a hydroxyl number of 540 mg KOH/g, prepared in the presence of imidazole as alkoxylation catalyst. This polyether was not worked up before being used in the subsequent esterification. The polyesterol has a hydroxyl functionality of 2.5, a hydroxyl number of 246 mg KOH/g and an oleic acid content in the polyesterol of 15% by weight.

Determination of Curing and Brittleness of Rigid Polyurethane Foam

Curing was determined using the bolt test. For this, at 2.5, 3, 4, 5, 6 and 7 minutes after mixing the components of the polyurethane foam in a polystyrene beaker, a steel bolt with a spherical cap 10 mm in radius was pressed by a tensile/compressive tester 10 mm deep into the mushroom-shaped foam formed. The maximum force in N required here is a measure of the curing of the foam.

Brittleness was determined for the rigid polyisocyanurate foam by determining the time at which the surface of the rigid foam displayed visible zones of breakage in the bolt test. Brittleness was further determined subjectively directly after foaming by compressing the foam and graded on a scale from 1 to 6, where 1 denotes a scarcely brittle foam and 6 a foam of high brittleness.

Determining the Self-Reactivity of Polyurethane Systems

The polyurethane systems described hereinbelow were adjusted to a unitary fiber time by varying the polyurethane catalyst concentration. When a system needed a lower concentration of catalyst, this was taken to mean that the system had higher self-reactivity.

Determination of Dimensional Stability

Dimensional stability is determined by determining element thickness after foaming. For this, a sandwich element with a 0.05 mm thick aluminum foil as outer layer material is produced in the double belt process and element thickness is determined in the center of the element 5 minutes after production. The closer the element thickness thus determined is to the spec element thickness (170 mm in the present case), the better the dimensional stability.

Inventive Examples 1 and 2 and Comparative Examples 1 and 2

Production of Rigid Polyurethane Foams (Variant 1):

The isocyanates and the components which are reactive toward isocyanate were foamed together with the blowing agents, catalysts and all further addition agents at a constant mixing ratio of polyol component to isocyanate of 100:180.

Polyol Component:

30 parts by weight of polyesterol as per inventive or comparative examples;

36.5 parts by weight of polyetherol having an OH number of 490 mg KOH/g prepared by polyaddition of propylene oxide onto a sucrose/glycerol mixture as starter molecule and an average functionality of 4.3;

6 parts by weight of polyetherol from ethoxylated ethylene glycol having an hydroxyl functionality of 2 and a hydroxyl number of 190 mg KOH/g;

25 parts by weight of trischloroisopropyl phosphate (TCPP) as flame retardant; and 2.5 parts by weight of Niax Silicone L6635 stabilizer from Momentive, and also Addition Agents in the Polyol Component:

5.5 parts by weight of S 80:20 pentane (consisting of 80 wt % n-pentane and 20 wt % isopentane);

about 2.2 parts by weight of water; and 1.0 part by weight of potassium acetate solution (47 wt % in ethylene glycol).

Furthermore dimethylcyclohexylamine (DMCHA) to adjust the fiber times, hereinafter also referred to as catalyst 1.

Isocyanate Component:

180 parts by weight of Lupranat® M50 (polymeric methylene(diphenyl diisocyanate) (PMDI), having a viscosity of about 500 mPa·s at 25° C. from BASF SE)

The components were intensively mixed using a laboratory stirrer. Foam density was adjusted to 41+/−1 g/L by varying the water content while keeping the pentane content constant at 5.5 parts. Fiber time was further adjusted to 45+/−1 s by varying the proportion of dimethylcyclohexylamine (DMCHA) (catalyst 1).

The results are summarized in table 1.

TABLE 1

| curing | Polyesterol 1 (comparator) | Polyesterol 2 | Polyesterol 3 (comparator) | Polyesterol 4 |
|---|---|---|---|---|
| 2.5 min | 45 | 47 | 44 | 47 |
| 3 min | 59 | 58 | 57 | 59 |
| 4 min | 84 | 83 | 80 | 81 |
| sum (2.5; 3 and 4 min) | 188 | 188 | 181 | 187 |
| brittleness (subjective) | 4.5 | 3 | 3.5 | 3 |
| breakage in bolt test | 6 min | no breakage | 7 min | no breakage |
| catalyst 1 | 1.6 | 1.4 | 1.6 | 1.5 |

It is clearly apparent that inventive polyester polyols 2 and 4 reduce the brittleness of the insulant and increase the self-reactivity of the systems without having any adverse effect on foam curing.

Inventive Examples 3 and 4 and Comparative Example 3

Production of Rigid Polyurethane Foams (Variant 2)

The isocyanates and also the isocyanate-reactive components were foamed together with the blowing agents, catalysts and all further addition agents at a constant mixing ratio of polyol component to isocyanate of 100:160.

Polyol Component:

30 parts by weight of polyesterol as per inventive or comparative examples;

37 parts by weight of polyetherol having an OH number of 490 mg KOH/g prepared by polyaddition of propylene oxide onto a sucrose/glycerol mixture as starter molecule and an average functionality of 4.3;

6 parts by weight of polyetherol from ethoxylated ethylene glycol having a hydroxyl functionality of 2 and a hydroxyl number of 190 mg KOH/g;

25 parts by weight of trischloroisopropyl phosphate (TCPP) as flame retardant; and 2 parts by weight of Niax Silicone L6635 stabilizer from Momentive, and also Addition Agents in the Polyol Component:

5.5 parts by weight of S 80:20 pentane;

about 1.8 parts by weight of water; and 1.2 parts by weight of potassium acetate solution (47 wt % in ethylene glycol).

Furthermore, about 0.9 part by weight of dimethylcyclohexylamine (DMCHA) to adjust the fiber time.

Isocyanate Component:

160 parts by weight of Lupranat® M50

Sandwich elements 170 mm in thickness were produced by the double belt process. Foam density was adjusted to 38+/−1 g/L by varying the water content while keeping the pentane content constant at 5.5 parts. Fiber time was further adjusted to 35+/−1 s by varying the proportion of dimethylcyclohexylamine.

The results are summarized in table 2.

TABLE 2

Results of tests to produce 170 mm thick sandwich elements by double belt process

| | Polyester polyol: | | |
|---|---|---|---|
| | Polyesterol 5 (comparator) | Polyesterol 6 | Polyesterol 7 |
| element thickness after foaming | 186 mm | 180 mm | 180 mm |

It is clearly apparent that inventive polyester polyols 6 and 7 improve the dimensional stability of rigid polyurethane foam.

I claim:

1. A process for preparing a rigid polyurethane foam or rigid polyisocyanurate foam comprising:
   preparing a mixture comprising:
   A) a polyisocyanate,
   B) a polyetherester polyol obtained by esterification of
      b1) 10 to 70 mol % of a dicarboxylic acid composition comprising
         b11) 50 to 100 mol %, based on the dicarboxylic acid composition, of an aromatic dicarboxylic acid or derivative thereof,
         b12) 0 to 50 mol %, based on the dicarboxylic acid composition b1), of an aliphatic dicarboxylic acid or derivative thereof,
      b2) 2 to 30 mol % of a fatty acid or fatty acid derivative,
      b3) 20 to 45 mol % of an aliphatic or cycloaliphatic diol having 2 to 18 carbon atoms or an alkoxylate thereof,
      b4) 15 to 35 mol % of a polyether polyol having a functionality of not less than 2 and a OH number of from 150 to 950 mg KOH/g, prepared by alkoxylation of
      a polyol having a functionality of above 2,
   all based on the total amount of components b1) to b4), wherein said components b1) to b4) sum to 100 mol %,
   C) optionally, a polyester polyol different from the polyetherester B),
   D) a polyether polyol,
   E) optionally flame retardants,
   F) a blowing agent,
   G) a catalyst, and
   H) optionally an auxiliary or additive,
   wherein
   a mass ratio of total components B) and optionally C) to component D) is less than 1.6; and
   reacting the mixture prepared to obtain the rigid polyurethane foam or rigid polyisocyanurate foam.

2. The process according to claim 1 wherein the mass ratio of total components B) and C) to component D) is greater than 0.1.

3. The process according to claim 1 wherein
   a polyesterpolyol is present, and
   a proportion of a total of B) and C) of the polyetherester polyol B) is at least 25 wt %.

4. The process according to claim 1 wherein no polyester polyol C) is present.

5. The process according to claim 1 wherein a functionality of the polyether polyol b4) is greater than 2.

6. The process according to claim 1 wherein the polyether polyol b4) is prepared by alkoxylating a polyol selected from the group consisting of sorbitol, pentaerythritol trimethylolpropane, glycerol, polyglycerol and a mixture thereof.

7. The process according to claim 1 wherein the polyether alcohol b4) is prepared by alkoxylation with ethylene oxide.

8. The process according to claim 1 wherein the polyether polyol b4) is prepared by alkoxylation with ethylene oxide in the presence of an aminic alkoxylation catalyst.

9. The process according to claim 1 wherein the aromatic dicarboxylic acid b11) comprises one or more compounds selected from the group consisting of terephthalic acid, dimethyl terephthalate, polyethylene terephthalate, phthalic acid, phthalic anhydride and isophthalic acid.

10. The process according to claim 1 wherein the dicarboxylic acid composition b1) comprises no aliphatic dicarboxylic acid b12).

11. The process according to claim 1 wherein the fatty acid or fatty acid derivative b2) is selected from the group consisting of oleic acid and methyl oleate.

12. The process according to claim 1 wherein the aliphatic or cycloaliphatic diol b3) is selected from the group consisting of ethylene glycol, diethylene glycol, propylene glycol, 1,3-propanediol, 1,4-butanediol, 1,5-pentanediol, 1,6-hexanediol, 2-methyl-1,3-propanediol and 3-methyl-1,5-pentanediol and alkoxylates thereof.

13. The process according to claim 1 wherein the polyetherol component D) is a polyetherol mixture of D1 a polyetherol prepared with propylene oxide, and D2 a polyetherol prepared with ethylene oxide.

14. The process according to claim 13 wherein an average OH functionality of the polyether polyol D1 is greater than 3, 4 and an OH number of the polyether polyol is above 300 mg KOH/g.

15. The process according to claim 14 wherein an average OH functionality of the polyether polyol D1 is below 6, and an OH number of the polyether polyol D1 is below 600 mg KOH/g.

16. A rigid polyurethane or polyisocyanurate foam obtained by the process according to claim 1.

17. A sandwich element, comprising:
a rigid or flexible outer layer; and
the rigid polyurethane or poluisocyanurate foam of claim 16.

18. A polyol component, comprising:
10 to 50 wt % of polyetherester polyol B),
0 to 30 wt % of a polyester polyol C),
25 to 55 wt % of a polyether polyol D),
10 to 40 wt % of a flame retardant E),
1 to 30 wt % of a blowing agent F),
0.5 to 10 wt % of a catalyst G), and
0 to 20 wt % of an auxiliary and/or additive H),
each based on the total weight of components B) to H), wherein the wt % add up to 100 wt %,
wherein the polyetherester polyol B) is obtained by esterification of
b1) 10 to 70 mol % of a dicarboxylic acid composition comprising
b11) 50 to 100 mol %, based on the dicarboxylic acid composition, of an aromatic dicarboxylic acid or derivative thereof,
b12) 0 to 50 mol %, based on the dicarboxylic acid composition b1), of an aliphatic dicarboxylic acid or derivative thereof,
b2) 2 to 30 mol % of a fatty acid or fatty acid derivative,
b3) 20 to 45 mol % of an aliphatic or cycloaliphatic diol having 2 to 18 carbon atoms or an alkoxylate thereof,
b4) 15 to 35 mol % of a polyether polyol having a functionality of not less than 2 and a OH number of from 150 to 1250 mg KOH/g, prepared by alkoxylation of a polyol having a functionality of above 2,
all based on the total amount of components b1) to b4), wherein said components b1) to b4) sum to 100 mol %,
and wherein a mass ratio of components B) and C) to component D) is less than 1.6.

* * * * *

UNITED STATES PATENT AND TRADEMARK OFFICE
CERTIFICATE OF CORRECTION

PATENT NO. : 10,472,454 B2  
APPLICATION NO. : 13/740732  
DATED : November 12, 2019  
INVENTOR(S) : Gunnar Kampf Page 1 of 1

It is certified that error appears in the above-identified patent and that said Letters Patent is hereby corrected as shown below:

In the Specification

In Column 9, Line 13 approx., delete "polester" and insert -- polyester --, therefor.

In Column 12, Line 60, delete "diethylhexoate" and insert -- diethylhexanoate --, therefor.

In Column 14, Line 28, delete "poylols" and insert -- polyols --, therefor.

In Column 14, Line 42, delete "poylols" and insert -- polyols --, therefor.

In Column 17, Line 9, delete "SE)" and insert -- SE). --, therefor.

In the Claims

In Column 19, Line 7 approx., Claim 6, delete "pentaerythritol" and insert -- pentaerythritol, --, therefor.

In Column 20, Line 9, Claim 17, delete "poluisocyanurate" and insert -- polyisocyanurate --, therefor.

Signed and Sealed this  
Twelfth Day of May, 2020

Andrei Iancu  
*Director of the United States Patent and Trademark Office*